US005819129A

United States Patent [19]

Robertson

[11] Patent Number: 5,819,129

[45] Date of Patent: Oct. 6, 1998

[54] FILM PACKET WITH ENVELOPE HAVING LIGHT-LOCKING FEATURES AT EDGES OF MOUTH OF ENVELOPE

[75] Inventor: Jeffrey C. Robertson, Rochester, N.Y.

[73] Assignee: Eastman Kodak Company, Rochester, N.Y.

[21] Appl. No.: 832,248

[22] Filed: Apr. 3, 1997

[51] Int. Cl.[6] .......... G03B 17/26

[52] U.S. Cl. .......... 396/517; 396/518

[58] Field of Search .......... 396/517, 518, 396/519, 520, 521, 522, 523, 524, 525, 526, 527, 528

[56] References Cited

U.S. PATENT DOCUMENTS

| | | | |
|---|---|---|---|
| 563,915 | 7/1896 | Eastman | 396/524 |
| 747,665 | 12/1903 | Tripp | 395/518 |
| 1,098,844 | 6/1914 | Schmuck | 396/518 |
| 2,573,655 | 10/1951 | Schwartz et al. | 396/522 |
| 3,373,673 | 3/1968 | Craig | 95/66 |
| 3,986,609 | 10/1976 | Marsh et al. | 206/455 |
| 4,258,263 | 3/1981 | Buldini et al. | 396/517 |
| 4,340,288 | 7/1982 | Stemme et al. | 354/171 |
| 4,456,358 | 6/1984 | Busch | 396/526 |
| 4,725,865 | 2/1988 | Hoffman, Jr. | 354/276 |

FOREIGN PATENT DOCUMENTS

818941-A 7/1996 Japan .

*Primary Examiner*—Eddie C. Lee
*Attorney, Agent, or Firm*—Charles E. Snee, III; Gordon M. Stewart

[57] ABSTRACT

A film packet includes a clip (42); a carrier (54) received into and attached to the clip; a film sheet (56) attached to the carrier; and an envelope (12) including two side panels (14, 16), the two side panels being joined along substantially three edges (18, 22, 24) of each and substantially unjoined along fourth edges (30, 31) of each, the two side panels slidably receiving therebetween the carrier with the attached film sheet, the unjoined fourth edges being received into the clip, the clip overlaying the fourth edges, the clip urging the fourth edges against the carrier, the envelope further including at least one light lock seal (60) for preventing ingress of light when the envelope becomes axially or transversely displaced in the clip.

17 Claims, 10 Drawing Sheets

FILM PACKET WITH ENVELOPE HAVING LIGHT-LOCKING FEATURES AT EDGES OF MOUTH OF ENVELOPE

FIELD OF THE INVENTION

The invention concerns photographic film packets in which a sheet of film is removably contained in a light-shielding envelope. More particularly, the invention relates to such packets having features near the mouth of the envelope for preventing light from entering the packet through the mouth.

BACKGROUND OF THE INVENTION

In the field of still photography, when using film in individual sheets, photographers for many years loaded one or two cut film sheets into a holder, which was subsequently appended to the back of a view camera, to allow a photographer to capture an image on the film. Such holders generally featured a central septum which supported, on each of its opposing faces, a sheet of film. A frame, wrapping around the four edges of the septum, had slots in one face to receive dark slides to cover and protect the sheets of film from exposure. A photographer using such a system would enter a photographic darkroom and load as many holders as might be required for an upcoming photographic session.

After carrying holders and camera to the site of the photographic session, the photographer would append each holder to the camera back, withdraw the dark slide, make the exposure, return the dark slide, invert the holder, repeat the previous three steps to expose the second film, then remove the holder from the camera, continuing in this manner until the photographic session was completed. The photographer would then return to the photographic darkroom, to unload the holders and process the film, or would package the film for shipment to a commercial processing laboratory.

In the middle 1980's an improved system for sheet film photography was introduced into the photographic world. For example, see U.S. Pat. Nos. 4,725,865 and 4,821,054. The improved system comprised a thin, light weight film packet for use in a film packet holder that mounted to cameras in the same manner as that of the sheet film holders previously described. The film packets included a light tight rectangular envelope, closed on three edges, which slidably received a film-carrier assembly through an open mouth at the fourth edge of the envelope. Two sheets of film could be supported on opposite faces of a carrier sheet; or, alternatively, only one sheet of film could be mounted to one face of a long carrier sheet, or affixed to an edge of a short carrier. A thin metallic clip, attached to an edge of the carrier, pinched the open mouth closed along the fourth edge of the envelope, when the film-carrier assembly was slipped fully into the envelope. The improved system has been a considerable commercial success.

When using the improved system, the photographer must carry only one film packet holder, and as many packets as are necessary for the planned photographic session. Thus, a considerable savings in volume and weight is achieved when compared with the number of the previous sheet film holders required for an equivalent session. During the session, the single film packet holder is mounted to the camera. A film packet is inserted into a packet receiving slot at one end of the holder, until a latching mechanism within the film packet holder engages the metallic clip. The photographer then partially withdraws the envelope, makes his exposure, and reseats the envelope into the metallic clip. The holder is then actuated to release the clip, and the packet is withdrawn from the holder. If the packet contains two sheets of film, the packet is turned over and reinserted into the holder, in the same manner, to expose the second sheet. Upon completion of the session, the photographer takes the exposed film packets into a photographic darkroom, where they are opened and the film sheets are removed for processing. Alternatively, the photographer may simply repackage the packets for shipment to a commercial processing laboratory.

While the above described improved system is more convenient for photographers, it is not totally trouble free. For example, if the film packets are not used and handled carefully, portions of the film may be fogged, or exposed by incidental ambient light, due to leakage of light past the clip into the envelope. Such leakage may occur, for example, if the envelope is not properly seated in the clip. Thus, it is desirable to improve the design of the components of the improved type of film packet, to prevent or minimize fogging of films.

SUMMARY OF THE INVENTION

A film packet according to the invention includes a clip; a carrier, the carrier being received into and attached to the clip; a film, the film being attached to the carrier; and an envelope, the envelope including two side panels, the two side panels being joined along substantially three edges of each, the two side panels being substantially unjoined along fourth edges of each to define an open end, the two side panels slidably receiving therebetween the carrier with the attached film, the unjoined fourth edges being received into the clip, the clip overlaying the fourth edges, and the clip urging the fourth edges against the carrier. Uniquely in accordance with the invention, the envelope includes at least one light lock seal extended toward the carrier from an edge of the envelope at the open end, to block ingress of light into the envelope when the envelope is displaced axially or transversely in the clip.

The light lock seal may include bonded portions of inside surfaces of the side panels. The portions may be adhesively or thermally bonded. The light lock seal may be formed by a spacer bonded between the side panels.

A film packet according to the invention may include a film carrier having an edge portion; a clip attached to the edge portion; a film sheet mounted to the film carrier; and a light-tight envelope including a pair of side panels joined along opposite side edges and an open end between the side edges, the open mouth having opposite ends, the film carrier with the film sheet being movable axially between a first position in which the film sheet is within the envelope and the clip receives the side panels to close the open end light-tightly and a second position in which the envelope is withdrawn to locate the film sheet outside the envelope. Uniquely in accordance with the invention, at each of the opposite ends of the open mouth, a light lock seal extends transversely between the side panels from each of the side edges toward the film carrier, each light lock seal being joined to at least one of the side panels and located at the open mouth to block light rays from entering the envelope and striking the film sheet when the side panels remain received in the clip but the clip and the envelope are displaced from the first position. The clip and envelope may be displaced axially, transversely, or both.

DETAILED DESCRIPTION OF THE INVENTION

Figure 1:
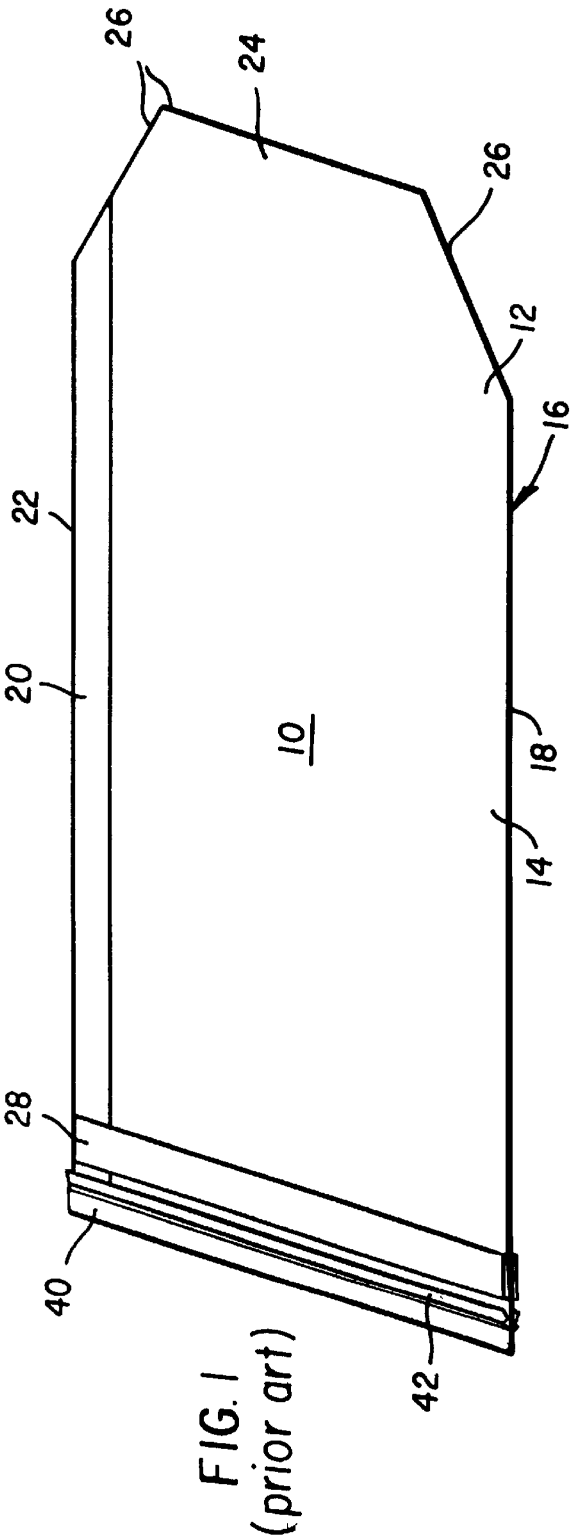
FIG. 1 (prior art)
FIG. 1 shows a perspective view of one of the prior art film packets.
Figure 3:
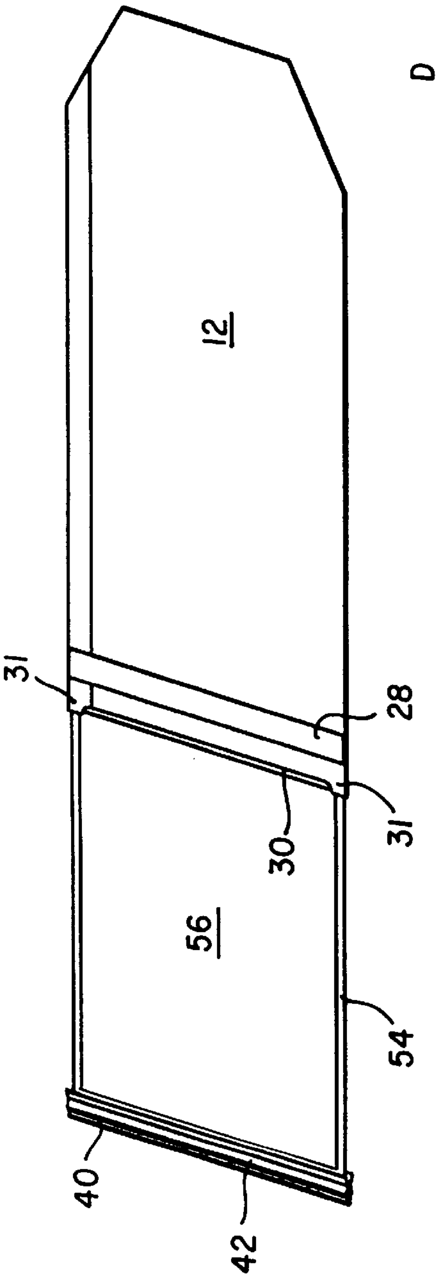
FIG. 3 (prior art)
FIG. 3 shows a perspective view of the film packet of FIG. 1, with the envelope withdrawn for exposure of the film.
Figure 4:
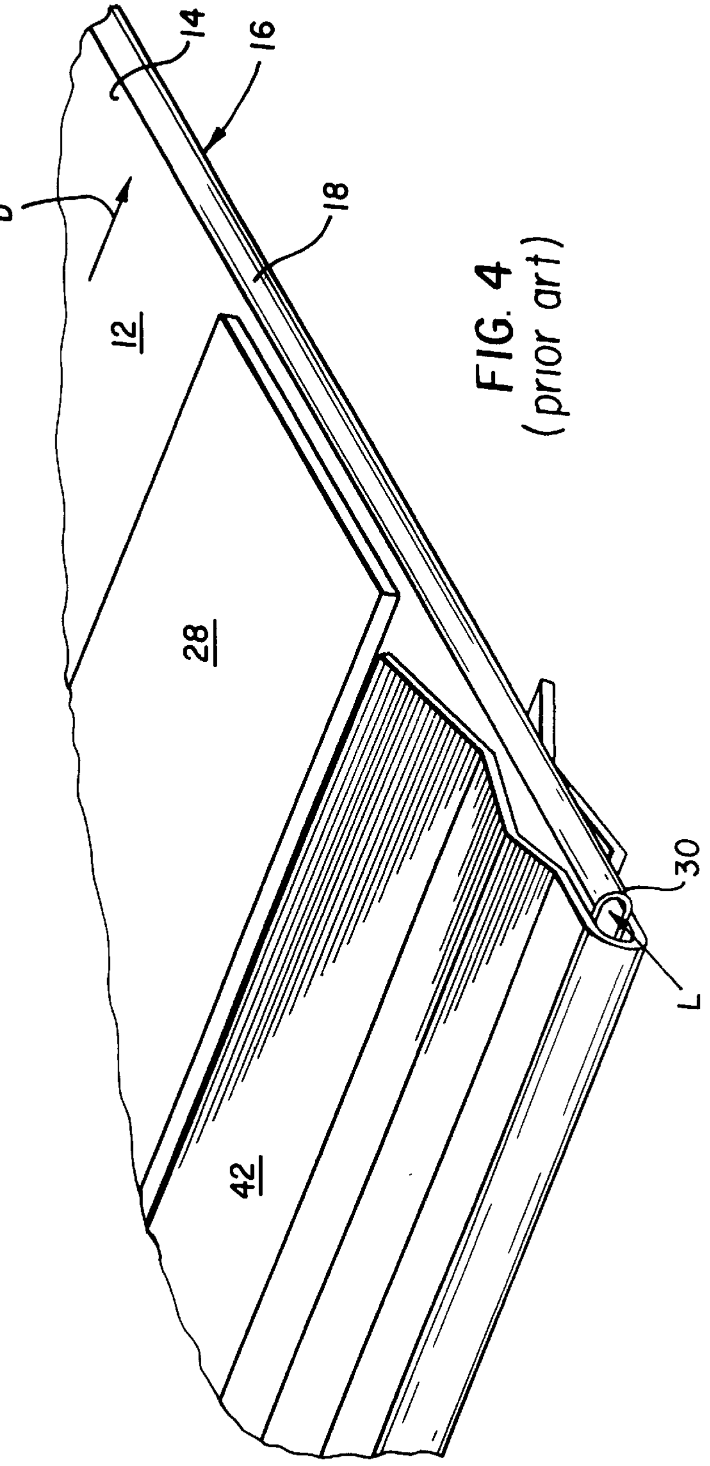
FIG. 4 (prior art)
FIG. 4 shows an enlarged partial perspective view of the film packet of FIG. 1, with the envelope slightly displaced transversely, whereby light can enter the envelope.

FIG. 1 shows a prior art film packet 10. An envelope 12 slidably receives a film-carrier assembly 40 therein. Envelope 12 is manufactured from a sheet material, such as paper, resin coated paper, or synthetic resinous sheet such as polystyrene, polyester, polyethylene, or polypropylene. Opacity is normally provided by inclusion of opacifiers within the sheet material, or by coating opacifying layers onto one or more surfaces of the sheet material. One method of manufacturing the envelope comprises folding a properly shaped sheet of material on a first line slightly miscentered on the sheet, and on a second line parallel to the first and located near the extended edge created by the first fold. This type of envelope is shown in FIG. 1, wherein a first envelope side panel 14 and second envelope side panel 16 are joined by a first edge 18 formed by the first fold. A seal tab 20 is joined to second envelope side panel 16 by a second edge 22 formed by the second fold. Seal tab 20 overlaps and is adhesively bonded to a portion of first envelope side panel 14. A sealed end 24 is produced at a first end of the envelope by adhesively bonding first envelope side panel 14 to second envelope side panel 16 along edges 26. As seen in FIGS. 3 and 4, a remaining open end 30 is left unsealed to allow envelope 12 to slidably receive film-carrier assembly 40.

Alternatively, envelope 12 may be formed by folding a properly shaped sheet exactly in half, and over-wrapping the edges opposite the fold with a seam tape, or by bringing two envelope sized sheets together, and over-wrapping both long edges with a seam tape. Over-wrapping seam tapes might also be utilized to produce sealed end 24. Adhesive bonding may be achieved by heat activation of heat activated or heat cured adhesives. Such heat activated adhesives may be applied selectively to limited areas of the sheet material used to form envelope 12, or the entire sheet stock may be coated. Alternatively, selectively applied pressure sensitive adhesives or cohesives may be employed. If resin coated papers are utilized, the resin coatings may be fused by heating or the application of ultrasonic energy to form the required bonds. Solid resinous sheets may be heat welded or ultrasonically welded to create appropriate bonds.

Figure 2:
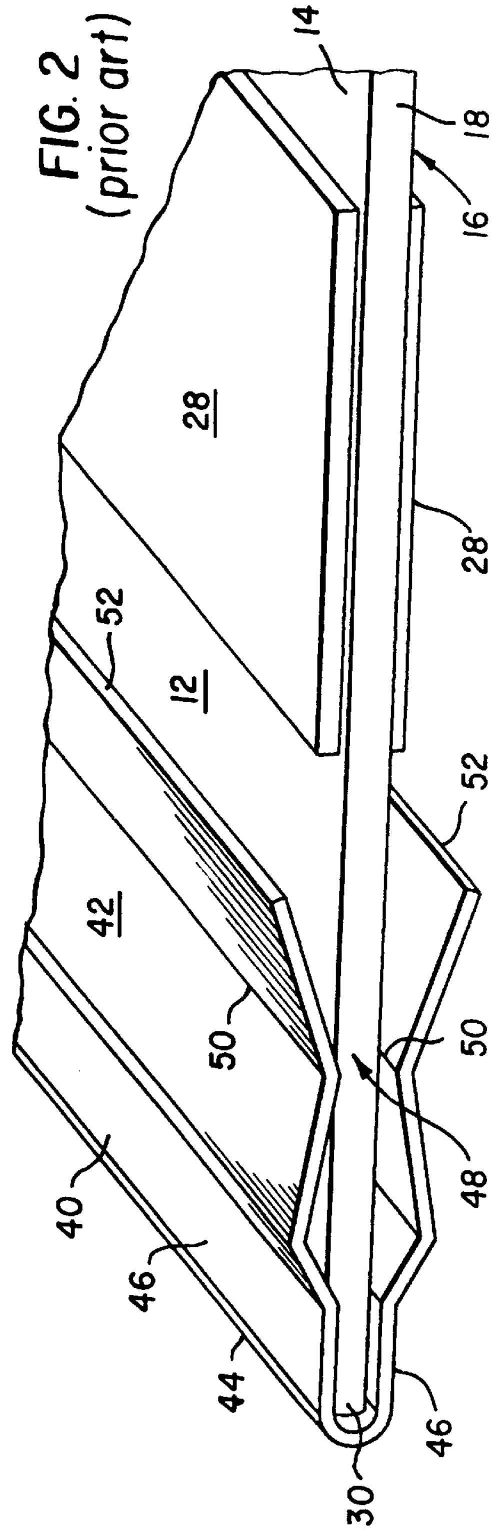
FIG. 2 (prior art)
FIG. 2 shows an enlarged partial perspective view of the film packet of FIG. 1.

As illustrated in FIG. 2, when film-carrier assembly 40 is fully inserted into envelope 12, an elongated clip 42 receives and significantly overlaps side panels 14, 16 next to open end 30, to prevent ingress of light into envelope 12. Clip 42 is formed from a relatively thin opaque sheet material, such as steel strip stock, which is folded in half with a relatively small bend radius, to produce a nose 44, adjoining two parallel spaced crimp plates 46. Additional bends complete the shaping of the clip, including throat bends 50. A narrow throat 48 is formed between bends 50 for the purpose of urging first envelope side panel 14 and second envelope side panel 16, adjacent open end 30, against the inserted film-carrier assembly 40, to further limit the ingress of light. Flared lips 52 receive open end 30 during insertion and guide open end 30 into throat 48. The length of clip 42 is marginally greater than the length of open end 30, so as to provide a minimal extension of the ends of clip 42 beyond first edge 18 and second edge 22, which also helps to limit ingress of light.

In use, a photographer fully inserts film packet 10, as shown in FIG. 1, into a typical film packet holder (not shown) through a film packet receiving slot on one edge of the holder, until latching mechanisms within the holder engage clip 42. Next the photographer grasps sealed end 24 and withdraws envelope 12 until a stop strip 28, adhesively bonded to first envelope side panel 14, engages another mechanism within the holder, to limit the withdrawal of envelope 12. FIG. 3 illustrates the relative position of the envelope 12 and the film-carrier assembly when the envelope is withdrawn for the purpose of exposing an image onto the film, within a typical packet film holder (not shown).

Figure 5:
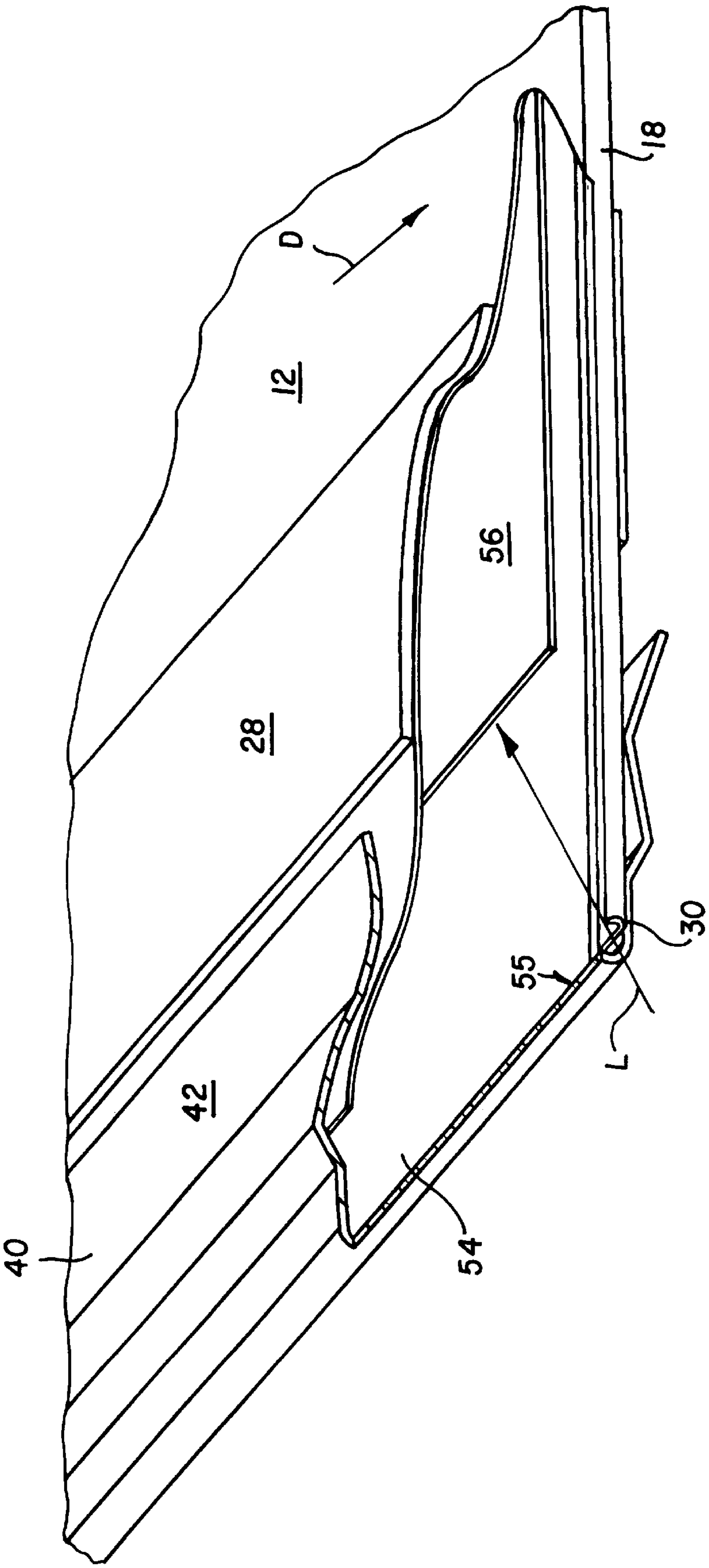
FIG. 5 (prior art)
FIG. 5 shows an enlarged partial cut-away perspective view of the film packet of FIG. 4, depicting an entry path for light.

As can be seen in FIGS. 3 and 5, film-carrier assembly 40 comprises clip 42 which is attached to a film carrier sheet 54, on which a film sheet 56 is mounted, such as by adhesive. Alternatively, the film sheet could be affixed to an edge of a short carrier. Attachment of carrier sheet 54 to clip 42 is commonly achieved by mechanically inwardly dimpling (not shown) crimp plates 46 to mechanically engage an edge portion 55 of carrier sheet 54 inserted into nose 44 of clip 42. Alternatively, an edge of carrier sheet 54 could be adhesively bonded to clip 42. Open end 30 includes at its opposite edges extended tabs 31 which fit into nose 44 of clip 42 on either side of the dimpling which holds the carrier sheet, thereby helping to block ingress of light when the envelope is properly seated in the clip. Carrier sheet 54 is manufactured to a width equal to or somewhat greater than the width of film sheet 56, but less than the interior dimension of envelope 12 between first edge 18 and second edge 22, to facilitate sliding the film-carrier assembly into and out of envelope 12.

After making an exposure, the photographer first slides the previously, partially withdrawn envelope 12 back into the packet receiving slot, until open end 30 is again seated into clip 42. The holder mechanisms are then released and film packet 10 is withdrawn from the holder. If the photographer is not careful to push open end 30 fully into clip 42, or if envelope 12 is displaced transversely in the direction of arrow D in FIG. 4, or both, a portion of open end 30 adjacent to first edge 18 may be distant from nose 44, or may extend beyond the end of clip 42, or both, sufficiently to allow ingress of an incident light ray L through open end 30 into envelope 12. If the pinching action in clip throat 48 is insufficient, or if there are sufficient irregularities in the interior surface of first envelope side panel 14 or the surface of carrier sheet 54, or both, then some portion of incident light ray L may reach a portion of film sheet 56, as illustrated in FIG. 5, where portions of clip 42, envelope 12, and stop strip 28 have been cut away to reveal the position of film sheet 56 within film packet 10. Strengthening the clip would be expected to reduce ingress of light; however, a stronger clip also would resist seating of open end 30 into the clip, thereby making the packet more difficult to use and potentially increasing the tendency to allow ingress of light. Texturing the interior surfaces of the envelope would be ineffective due to the low angles of incidence of light at which changes in texture would not be expected to yield much change in reflectivity.

Figure 6:
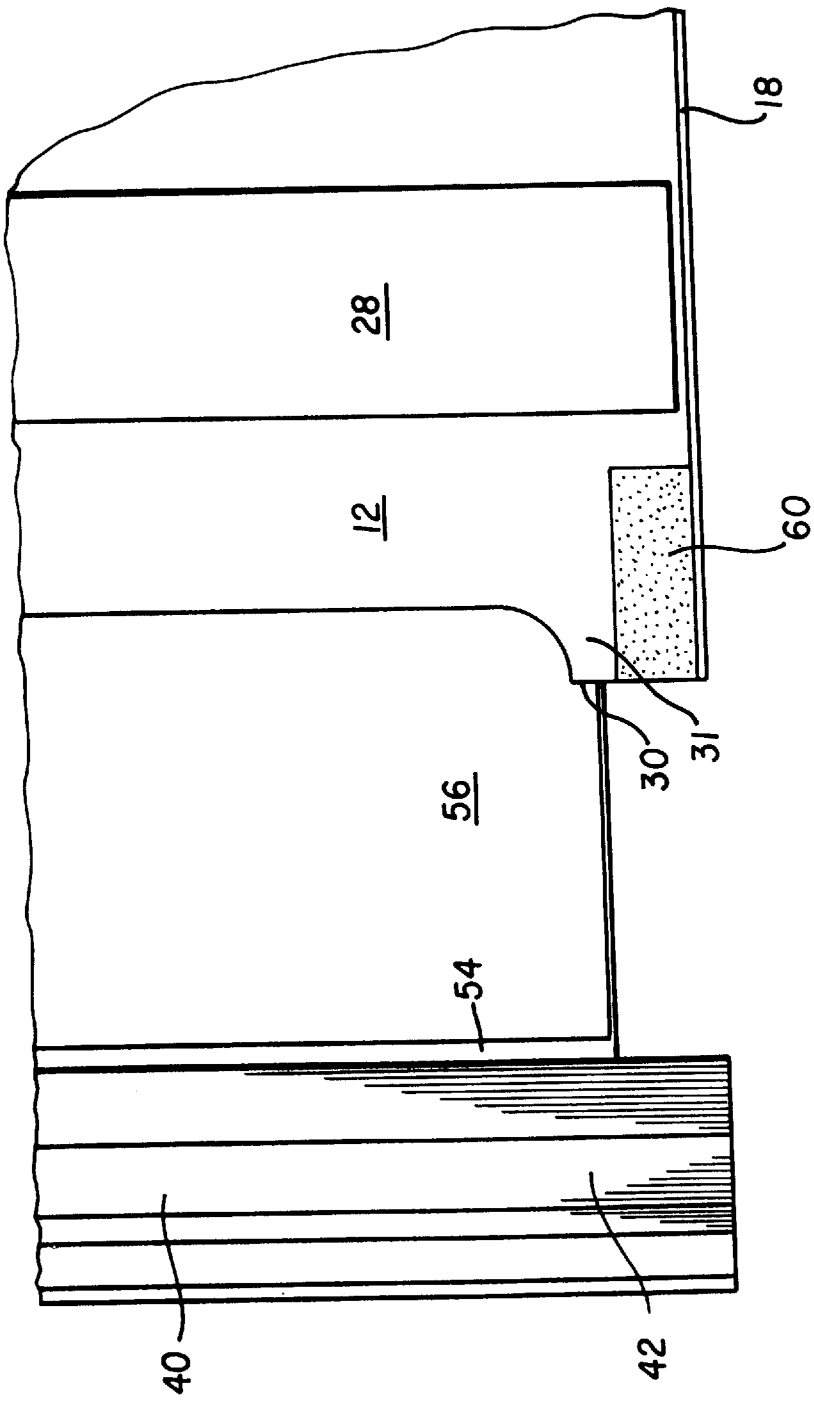
FIG. 6 shows an enlarged partial top view of a film packet according to the present invention, with the envelope partially withdrawn.
Figure 7:
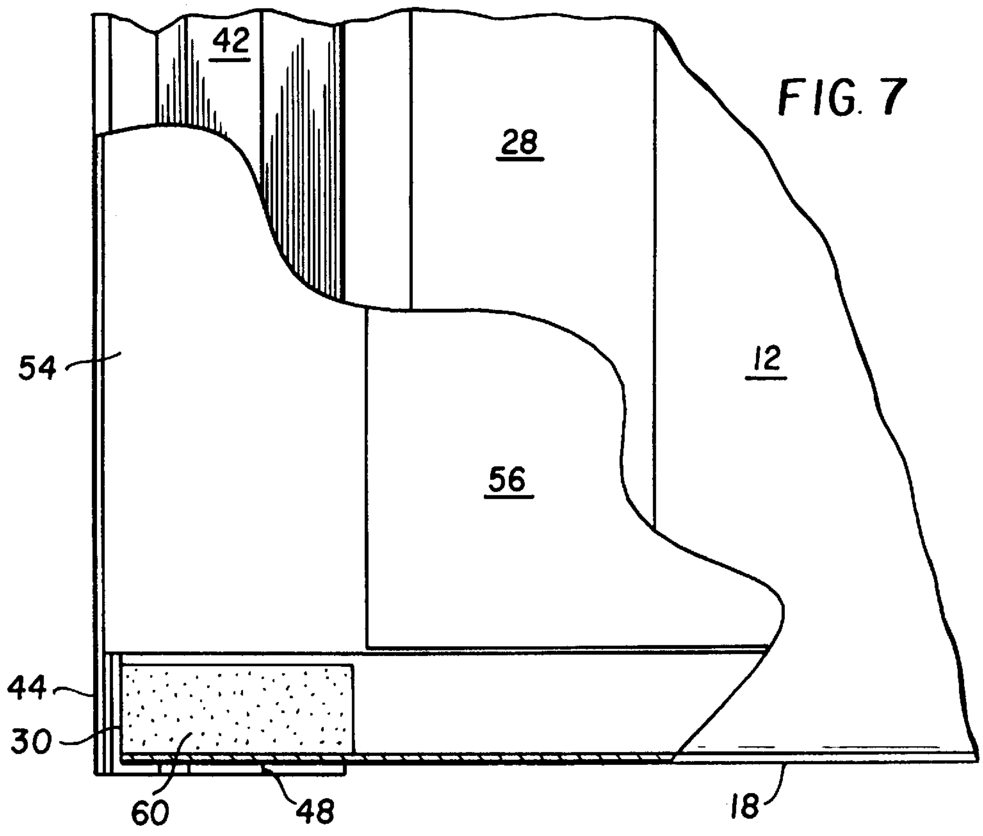
FIG. 7 shows an enlarged partial top cut-away view of the film packet of FIG. 6, with the envelope properly seated.

A film packet according to the present invention is shown in FIG. 6, where film-carrier assembly 40 is shown partially withdrawn from envelope 12, for clarity. The objective of the invention is to close the paths for ingress of light into the envelope as much as practical, given anticipated axial and transverse displacements of the envelope within the clip, as previously discussed. The paths are closed by first establishing a larger clearance between the carrier sheet and the inside edges of the envelope and then closing that clearance at opposite ends of open end 30. Compared to the prior art packet of FIGS. 1 to 5, carrier sheet 54 is reduced in width to substantially the same width as film sheet 56. Changing the width of film sheet 56 or envelope 12 is not considered practical since these dimensions are essentially standard for film packets of this type. To reduce opportunities for light to reach the edge of film sheet 56 adjacent clip 42, a light lock seal 60 is provided to close the larger clearance at each end of open end 30, as indicated by the cross-hatched area of FIGS. 6, 9 and 10. Each of seals 60 preferably extends between side panels 14, 16 and transversely inward from its respective edge 18, 22 to a distance S, shown in FIGS. 7 and 8, which will minimize opportunities for light rays to reach the film sheet when normal, accidental misuse of the film packet causes the envelope to be slightly withdrawn or offset from clip 42. Preferably, seals 60 are bonded to the inside surfaces of the side panels. To facilitate insertion of film-carrier assembly 40 into envelope 12, a transverse clearance is provided between each seal 60 and the adjacent longitudinal edge of carrier sheet 54, preferably in the range of about 1 to 4 mm (0.025 to 0.150 in). Seals 60 also extend axially along tabs 31 and into the envelope from open end 30; however, the axial extent of the seals is less important than their transverse extent S, for the purpose of blocking ingress of light. The seals should extend far enough axially to avoid tearing or pulling free of the side panels during normal use. Seals 60 may extend axially far enough to be pinched in clip throat 48 when the envelope is properly seated in clip 42, as indicated in FIG. 7; however, this is not required. Seals 60 may be formed by adhesively bonding small rectangular portions of inside surfaces of first envelope side panel 14 to second envelope side panel 16. The desired bonding may be achieved thermally by external application of heat and pressure to the small portions when the side panels incorporate thermally fusible material, by application of adhesive and pressure to the small portions, and by similar techniques, as will be apparent to the skilled person upon consideration of this description. Alternatively, a spacer could be inserted between the side panels to provide seal 60. Preferably, the spacer would be bonded to both side panels; however, a spacer of compliant material could be attached to only one side panel and would expand to maintain contact with the other side panel.

Figure 8:
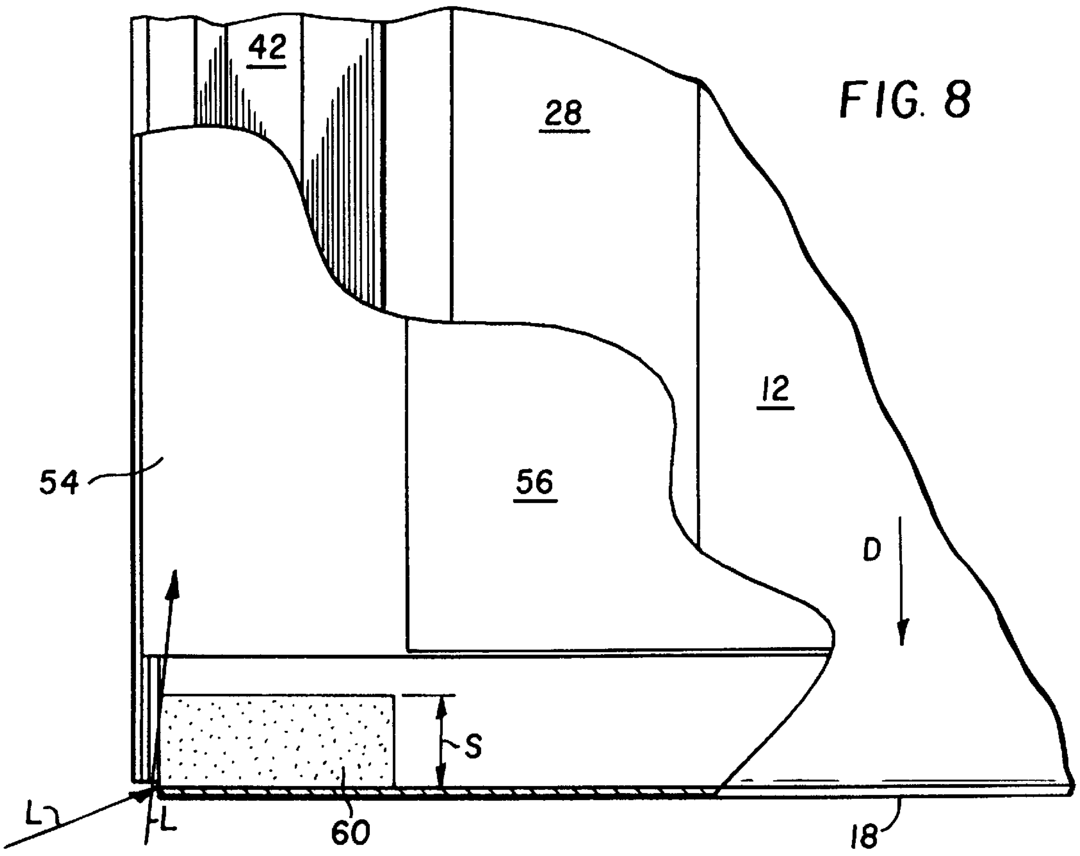
FIG. 8 shows an enlarged partial top cut-away view of the film packet of FIG. 6, with the envelope displaced transversely.

In FIG. 7, a portion of envelope 12, stop strip 28, and clip 42 are cut away to better illustrate the location of light lock seal 60 when film-carrier assembly 40 is fully inserted into envelope 12 so that open end 30 is seated into nose 44 and envelope 12 is centered in clip 42. FIG. 8 shows envelope 12 slightly withdrawn from and transversely offset within clip 42, so that light ray L has a pathway to enter the envelope. The light-locking effect of seals 60 is apparent since light ray L is confined by seal 60 to a pathway which runs at a much more shallow angle to the edge of film sheet 56 than in the prior art packet shown in FIG. 5. The transverse width of seal 60 is chosen so that, although some light rays L may still enter film packet 10 when the envelope is partially withdrawn or offset, or both, such light rays would enter at angles too shallow to allow them to strike an edge of film sheet 56.

Figure 9:
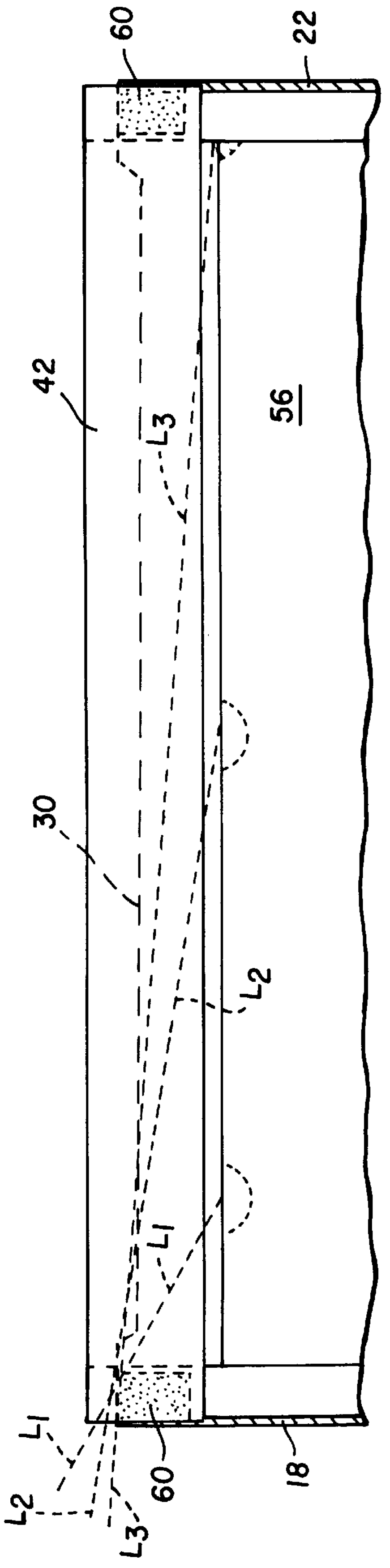
FIG. 9 shows a fragmentary, partially cut away view of the film packet of FIG. 6, with light rays entering between the clip and envelope at one side and striking an edge of the film sheet.
Figure 10:
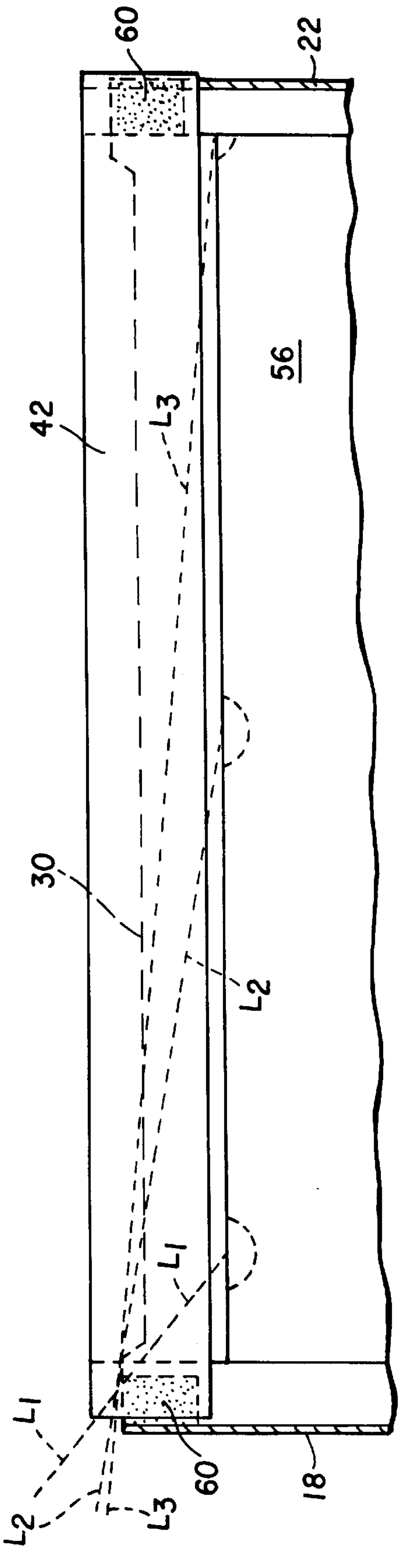
FIG. 10 shows a fragmentary, partially cut away view of the film packet of FIG. 8, with light rays entering between the clip and envelope at one side and striking an edge of the film sheet.

The potential effect of seals 60 is shown schematically in FIG. 9 where envelope 12 has been withdrawn to a maximum anticipated extent and in FIG. 10 where envelope 12 has been withdrawn and offset to maximum anticipated extents. Seals 60 are shown with greatly exaggerated transverse widths, for illustrative purposes; but the skilled person will understand that the maximum width of the seals must allow for clearance to carrier sheet 54, in the manner previously described. For seals 60 with the illustrated transverse widths, a light ray $L_1$ at a steep angle could strike an edge of film sheet 56 near the point of entry; a light ray $L_2$ at a more shallow angle could strike the edge at a central location; and a light ray $L_3$ at a most shallow angle could strike the edge at an opposite corner of film sheet 56. Thus, the edge of the film sheet could become fogged along most of its length. In the configuration of FIG. 10, the light rays can enter at even steeper angles since the envelope is withdrawn and offset, thus permitting fogging along a still greater portion of the edge of the film sheet. As the transverse width of seal 60 is increased in accordance with the invention, the portion of the film which can be struck by incident light rays decreases. Thus, for a given packet geometry and anticipated displacements between the clip and envelope, the light rays can be confined to increasingly more shallow paths until essentially no light will strike an edge of the film sheet 56.

Figure 11:
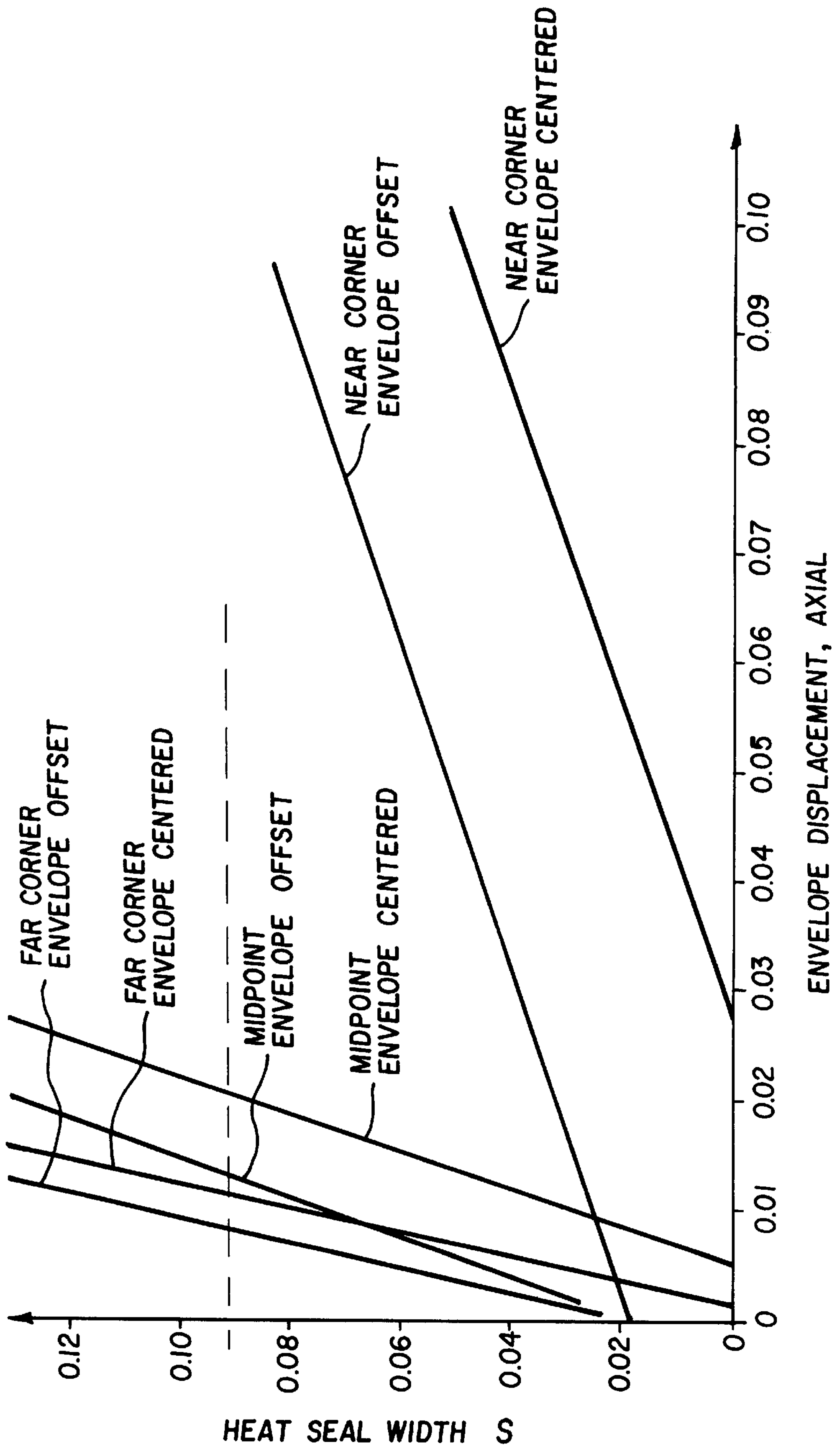
FIG. 11 shows a plot of envelope displacement versus light lock seal width, with the envelope centered and partially withdrawn or offset transversely and partially withdrawn, indicating conditions under which light rays may enter the film packet.

FIG. 11 illustrates graphically how increasing the transverse width S of seals 60 in accordance with the invention will reduce opportunities for light to strike the film sheet. The scales of the figure are in inches, but could be scaled to any units. The transverse displacement is assumed to be the maximum possible for the illustrated packet. The axial displacement is assumed to be in a range of 0.010 to 0.015 units, based upon actual field experience with the illustrated packet. FIG. 11 shows that, when seals 60 are omitted, as in the packets of FIGS. 1 to 5, light will strike the film sheet near the corner of entry of the light, when the centered envelope is withdrawn about 0.03 units; near the midpoint of the edge, when the envelope is withdrawn about 0.005 units; and near the far corner of the edge, when the envelope is withdrawn about 0.001 units. Similar but worse effects are observed when the envelope is offset. For example, light will strike the near corner of the film when the envelope is offset transversely but not axially. However, when seals 60 are provided in accordance with the invention, the permissible amount of axial and transverse displacement increases as the transverse width S of the seal increases. For example, if a seal width of about 0.09 units is selected, as indicated by the dashed line, axial displacement of a centered envelope of up to about 0.01 units can be tolerated without risk of exposing the far corner, or any other portion, of the film sheet. For the same seal width, an envelope at maximum transverse displacement may be displaced axially up to about 0.008 units without risk of exposing the film sheet. Seals of widths even less than 0.09 units have been found to prevent leakage in simulated field conditions, when compared to packets without seals under the same conditions. Thus, seals 60 effectively eliminate ingress of light for more than half of the anticipated range of displacement of envelope 12, a very substantial improvement over the prior art packets. And at larger displacements, the presence of seals 60 reduces the portion of the edge of the film sheet which may be fogged by light.

Figure 12:
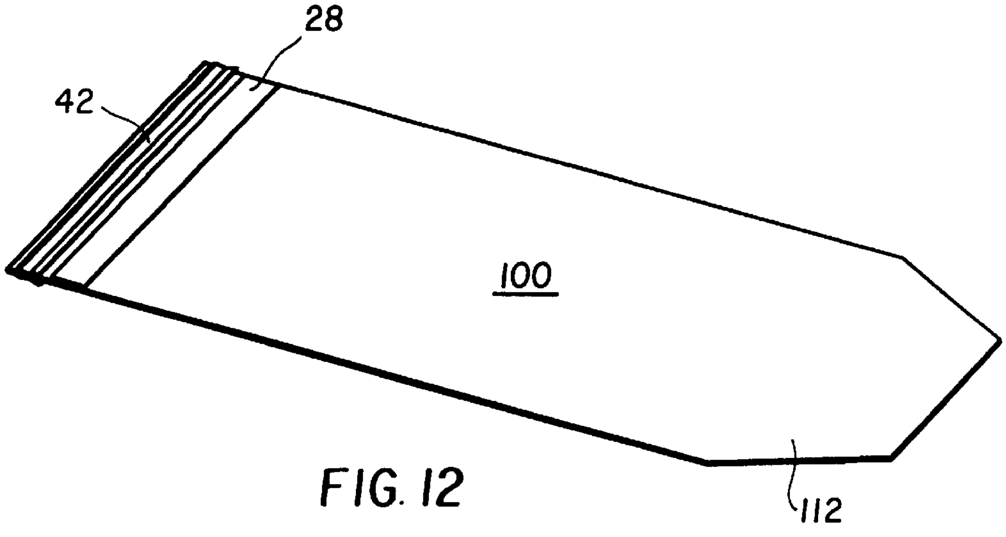
FIG. 12 shows a perspective view of a film packet, with an envelope of an alternate construction.
Figure 13:
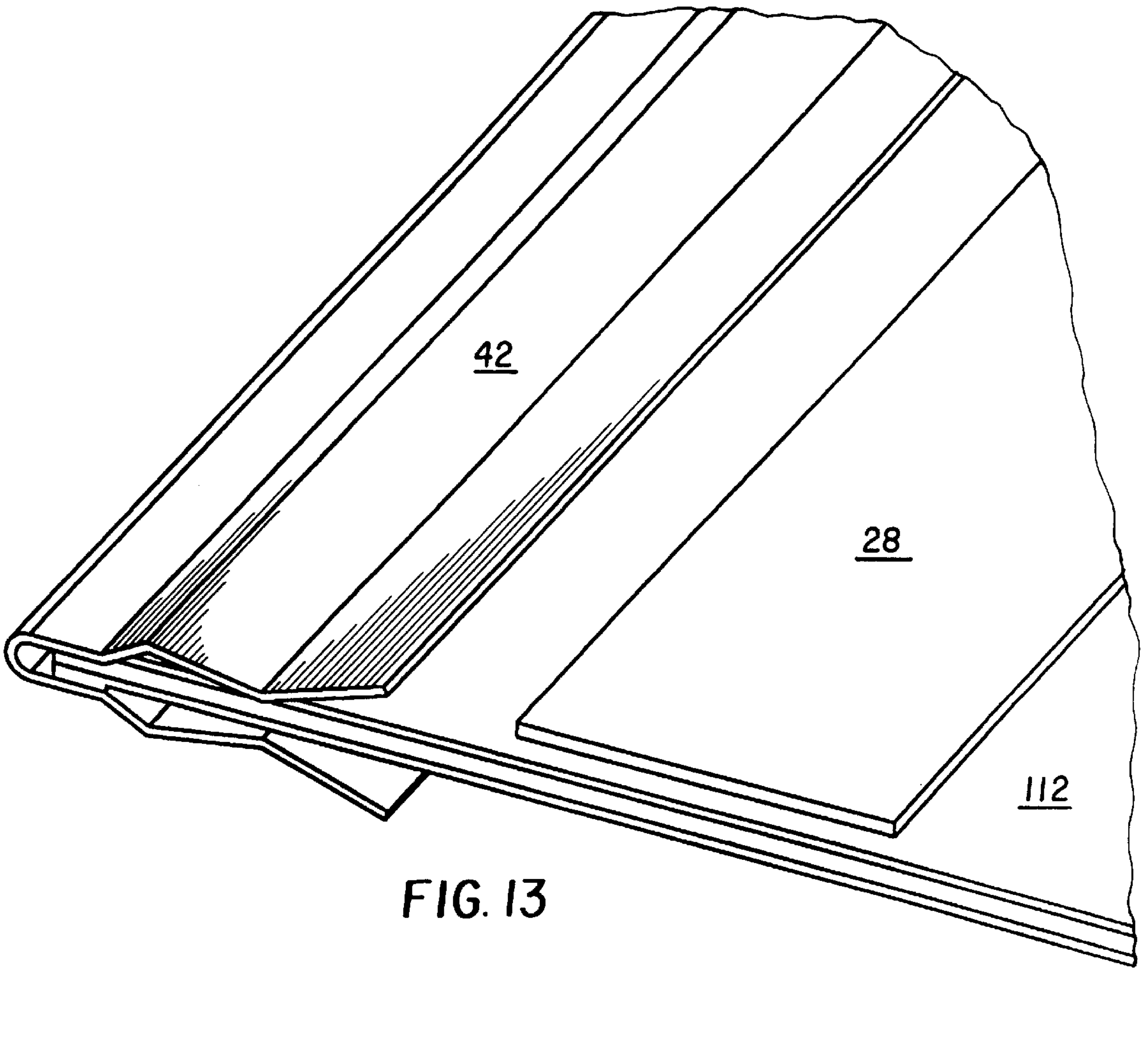
FIG. 13 shows an enlarged partial perspective view of the film packet of FIG. 12.
Figure 14:
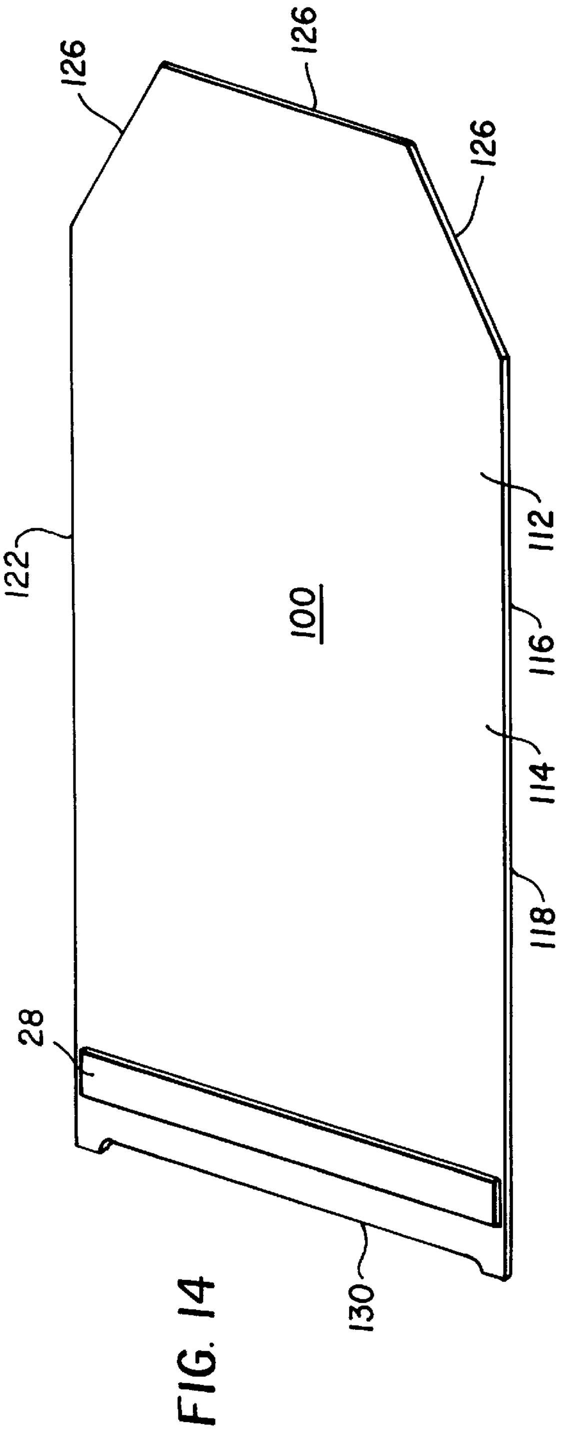
FIG. 14 shows a perspective view of the envelope of the film packet of FIG. 12.
Figure 15:
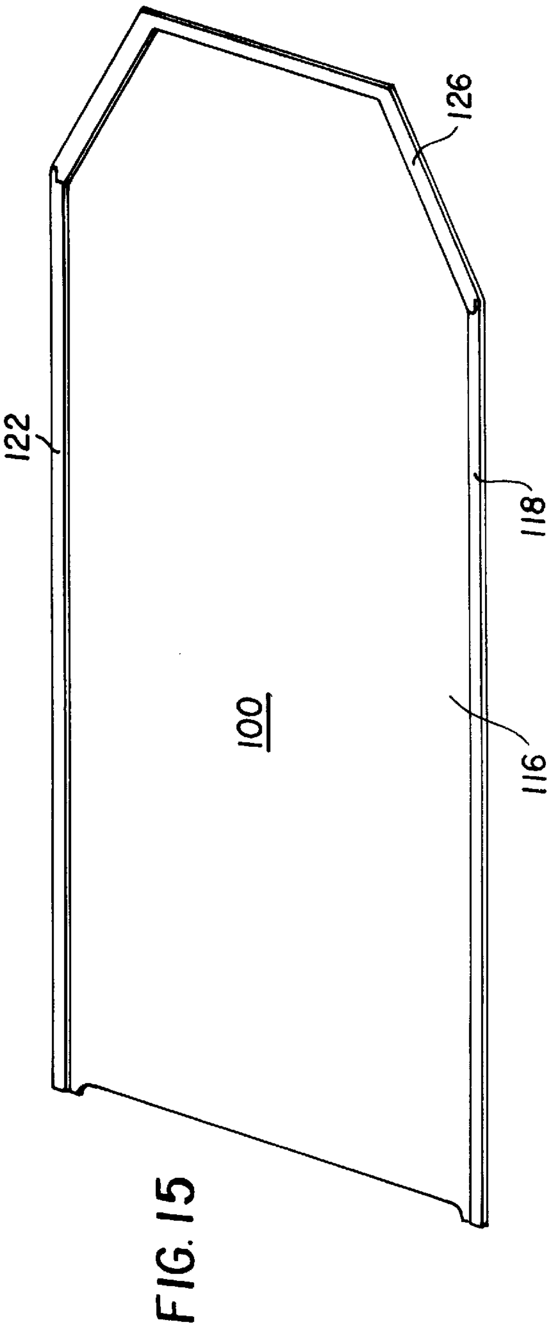
FIG. 15 shows a perspective cut-away view of the envelope of FIG. 14, with one facing sheet removed.

FIGS. 12 and 13 depict another embodiment of film packet 10. Alternative film packet 100 is comprised of an alternative envelope 112 which contains the film-carrier assembly 40 illustrated in FIGS. 6, 7, and 8, with narrow carrier 54. FIGS. 14 and 15 illustrate the construction of alternative envelope 112, wherein a first side rail 118, a second side rail 122, and an end rail 126 are adhesively bonded between interior faces of first envelope face panel 114 and second envelope face panel 116. First side rail 118, second side rail 122, and end rail 126 are manufactured from a sheet material similar to the material used for first envelope face panel 114, but with a thickness selected to create a spacing between the interior surfaces of face panels 114, 116, to facilitate slidably inserting film-carrier assembly 40 into open end 130.

Figure 16:
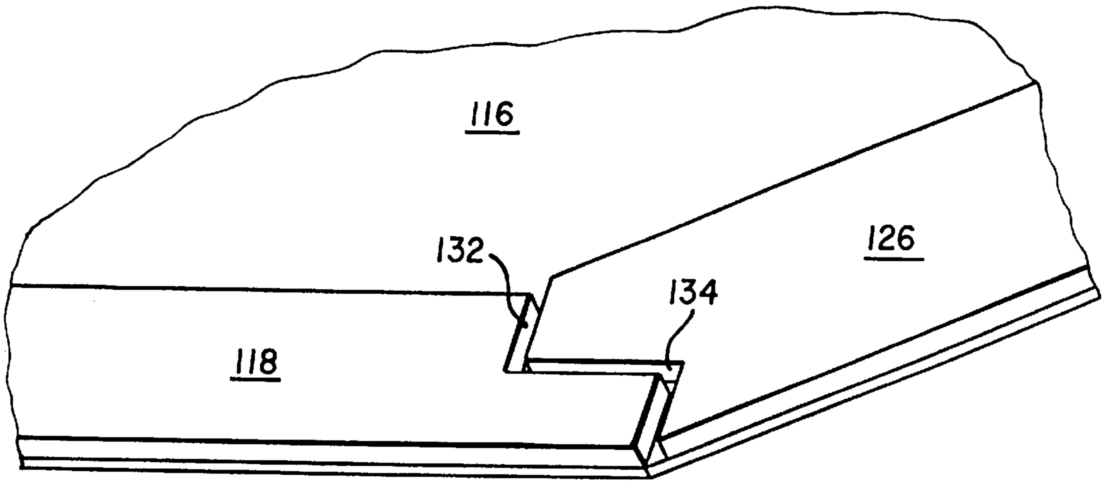
FIG. 16 shows an enlarged partial cut away view of the envelope of FIG. 14, illustrating a joint between side rails and end piece.
Figure 17:
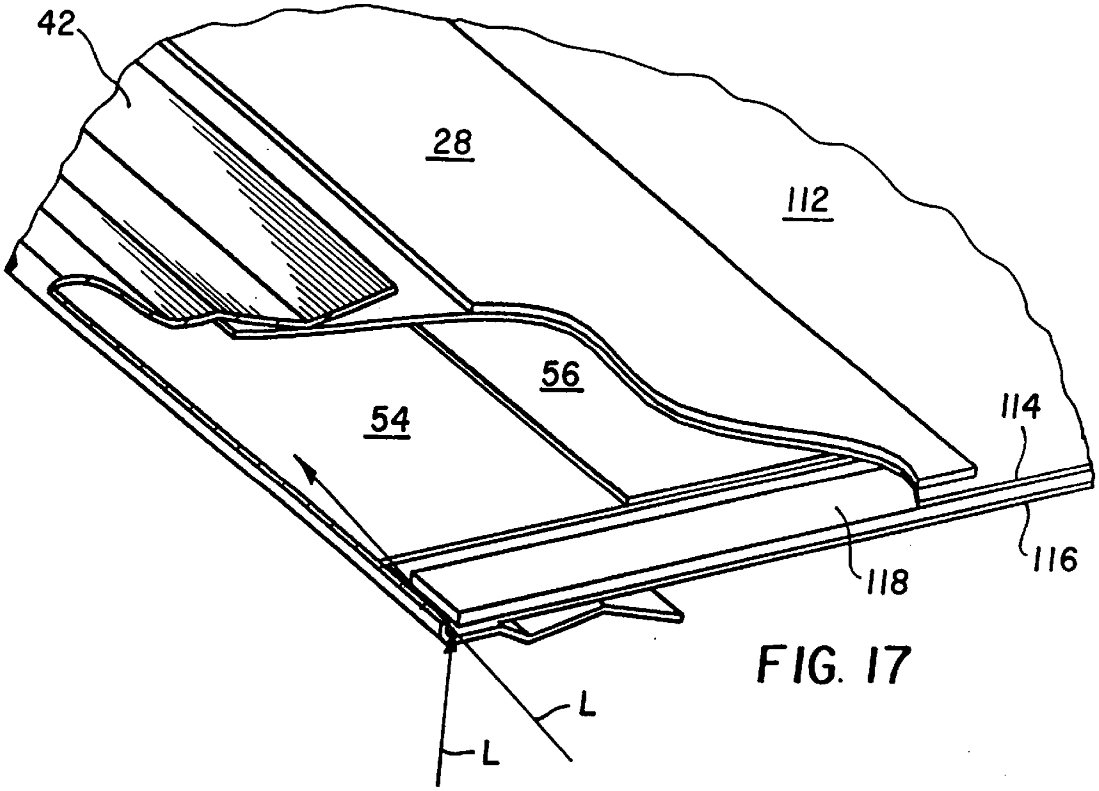
FIG. 17 shows an enlarged partial cut away view of the film packet of FIG. 12, illustrating the light blocking structure.

FIG. 16 provides detail about the juncture of side rails 118, 122 with end rail 126. A side rail notch 132 in side rail 118 and an end rail notch 134 in end rail 126 interlock in such a manner that, although side rail 118 and end rail 126 do not tightly contact one another, light is prevented from entering envelope 112 through the tortuous path of the joint between side rails 118, 122 and end rail 126. FIG. 17 illustrates that side rails 118, 122 provide a light blocking structure functionally equivalent to light lock seal 60 of FIGS. 6, 7, and 8.

While two embodiments of an envelope for an improved film packet have been disclosed, those skilled in the art will recognize that many additional methods of envelope construction could also be employed to produce the inventive light lock seals. For example, the interior faces of first and second envelope face panels could be sealed together along three sides, in a pattern represented by the side rails and end rail. The side and end rails could be formed by inwardly folding edges of one or both envelope face panels. Or, the face panels could be made with shallow hat-like sections formed by embossing, stamping, profile extruding, or thermoforming the envelope sheet material, with brims on the sections being sealed together to form the envelope.

The invention has been described in detail with particular reference to certain preferred embodiments thereof, but it will be understood that variations and modifications can be effected within the spirit and scope of the invention.

PARTS LIST

10 . . . film packet
12 . . . envelope
14 . . . first envelope side panel
16 . . . second envelope side panel
18 . . . first edge
20 . . . seal tab
22 . . . second edge
24 . . . sealed end
26 . . . edges
28 . . . stop strip
30 . . . open end
31 . . . tabs at ends of 30
32 . . .
34 . . .
36 . . .
38 . . .
40 . . . film carrier assembly
42 . . . clip
44 . . . nose
46 . . . crimp plates
48 . . . clip throat
50 . . . throat bend
52 . . . flared lip
54 . . . film carrier sheet
55 . . . edge portion of 54
56 . . . film sheet
D . . . direction of transverse displacement of 12
60 . . . light lock seal
S . . . transverse extent of 60
L, $L_1$, $L_2$, $L_3$ . . . light rays
62–98 . . .
100 . . . alternate packet
102–110 . . .
112 . . . alternative envelope
114 . . . first envelope face panel
116 . . . second envelope face panel
118 . . . first side rail
120 . . .
122 . . . second side rail
124 . . .
126 . . . end rail
128 . . .
130 . . . open end
132 . . . side rail notch
134 . . . end rail notch

What is claimed is:

1. A film packet comprising:

a clip;

a carrier, said carrier being received into and attached to said clip;

a film, said film being attached to said carrier, and an envelope, said envelope further comprising two side panels, said two side panels being joined along three edges of each side panel, said two side panels being unjoined along fourth edges of each side panel to define an open end, said two side panels slidably axially receiving therebetween said carrier with said attached film, said unjoined fourth edges being received into said clip, said clip overlaying said fourth edges, said clip urging said fourth edges against said carrier, said envelope further characterized by having at least one light lock seal extended toward said carrier from an edge of said envelope at said open end and only part way into said open end, to block ingress of light into said envelope when said envelope is displaced axially or transversely in said clip.

2. A film packet according to claim 1 wherein said light lock seal comprises bonded portions of inside surfaces of said side panels.

3. A film packet according to claim 2, wherein said portions are adhesively bonded.

4. A film packet according to claim 2, wherein said portions are thermally bonded.

5. A film packet according to claim 1, wherein said light lock seal is formed by a spacer bonded between said side panels.

6. A film packet according to claim 1 wherein there is a clearance between the seal and a longitudinal edge of the carrier.

7. A film packet according to claim 6 wherein the clearance is between 1 to 4 mm.

8. A film packet, comprising:

a film carrier having an edge portion;

a clip attached to said edge portion;

a film sheet mounted to said film carrier;

a light-tight envelope including a pair of side panels joined along opposite side edges and an open end between said side edges, said open end having opposite ends, said film carrier with said film sheet being movable axially between a first position in which said film sheet is within said envelope and said clip receives said side panels to close said open end light-tightly and a second position in which said envelope is withdrawn to locate said film sheet outside said envelope; and at each of said opposite ends of said open end, a light lock seal extended transversely between said side panels from each of said side edges toward said film carrier and only part way into said open end, each said light lock seal being joined to at least one of said side panels and located at said open end to block light rays from entering said envelope and striking said film sheet when said side panels remain received in said clip but said clip and said envelope are displaced from said first position.

9. A film packet according to claim 8, wherein said clip and said envelope are displaced axially from said first position.

10. A film packet according to claim 8, wherein said clip and said envelope are displaced transversely from said first position.

11. A film packet according to claim 8, wherein said clip and said envelope are displaced axially and transversely from said first position.

12. A film packet according to claim 8, wherein said each said light lock seal comprises bonded portions of inside surfaces of said side panels.

13. A film packet according to claim 12, wherein said portions are adhesively bonded.

14. A film packet according to claim 12, wherein said portions are thermally bonded.

15. A film packet according to claim 8, wherein each said light lock seal is formed by a spacer bonded between said side panels.

16. A film packet according to claim 8 wherein there is a clearance between each seal and a corresponding longitudinal edge of the carrier.

17. A film packer according to claim 16 wherein the clearance is between 1 to 4 mm.

* * * * *